(12) United States Patent
Miki et al.

(10) Patent No.: US 7,695,709 B2
(45) Date of Patent: Apr. 13, 2010

(54) HYDROGEN GENERATING MATERIAL AND METHOD FOR PRODUCING THE SAME, AND METHOD FOR PRODUCING HYDROGEN

(75) Inventors: Takeshi Miki, Osaka (JP); Toshihiro Nakai, Osaka (JP); Shoji Saibara, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 218 days.

(21) Appl. No.: 11/665,022

(22) PCT Filed: Mar. 17, 2006

(86) PCT No.: PCT/JP2006/005404

§ 371 (c)(1),
(2), (4) Date: Apr. 10, 2007

(87) PCT Pub. No.: WO2006/103959

PCT Pub. Date: Oct. 5, 2006

(65) Prior Publication Data
US 2009/0041657 A1    Feb. 12, 2009

(30) Foreign Application Priority Data

| Mar. 25, 2005 | (JP) | ............................. 2005-087600 |
| Apr. 28, 2005 | (JP) | ............................. 2005-131370 |

(51) Int. Cl.
*C01B 3/08*    (2006.01)
(52) U.S. Cl. ...................................... 423/657
(58) Field of Classification Search ....................... None
See application file for complete search history.

(56) References Cited

U.S. PATENT DOCUMENTS

| 3,890,166 | A  | * | 6/1975 | Kondis .................... 148/248 |
| 6,440,385 | B1 |   | 8/2002 | Chaklader et al. |
| 6,506,360 | B1 |   | 1/2003 | Andersen et al. |
| 6,582,676 | B2 | * | 6/2003 | Chaklader ................ 423/648.1 |

(Continued)

FOREIGN PATENT DOCUMENTS

JP    2566248 B2    10/1996

(Continued)

OTHER PUBLICATIONS

Zhen-Yan Deng et al., Journal of the American Ceramic Society, Apr. 2005, vol. 88, No. 4, pp. 977 to 979.

(Continued)

*Primary Examiner*—Melvin C Mayes
*Assistant Examiner*—Stefanie Cohen
(74) *Attorney, Agent, or Firm*—Birch, Stewart, Kolasch & Birch, LLP (57) ABSTRACT

A hydrogen generating material of the present invention includes at least one metal material selected from aluminum and aluminum alloy. The metal material has a surface film that includes a metal phase containing aluminum in the metallic state and an inactive phase containing an oxide or hydroxide of aluminum. A method for producing the hydrogen generating material of the present invention includes pulverizing aluminum or aluminum alloy in a liquid containing water and an organic solvent. A method for producing hydrogen of the present invention includes producing hydrogen by a reaction between the hydrogen generating material of the present invention and water.

18 Claims, 4 Drawing Sheets

U.S. PATENT DOCUMENTS

| | | | |
|---|---|---|---|
| 7,008,609 B2 * | 3/2006 | Watanabe et al. | ........... 423/657 |
| 2002/0048548 A1 | 4/2002 | Chaklader | |
| 2004/0208820 A1 | 10/2004 | Watanabe et al. | |
| 2006/0034756 A1 | 2/2006 | Watanabe et al. | |

FOREIGN PATENT DOCUMENTS

| | | |
|---|---|---|
| JP | 2001-31401 A | 2/2001 |
| JP | 2004-505879 A | 2/2004 |
| JP | 2004-123517 A | 4/2004 |
| JP | 2004-231466 A | 8/2004 |
| JP | 2005-162552 A | 6/2005 |
| JP | 2006-45004 A | 2/2006 |
| WO | WO-02/14213 A2 | 2/2002 |

OTHER PUBLICATIONS

English translation of JP 2004-231466 published Aug. 19, 2004.

* cited by examiner

HYDROGEN GENERATING MATERIAL AND METHOD FOR PRODUCING THE SAME, AND METHOD FOR PRODUCING HYDROGEN

TECHNICAL FIELD

The present invention relates to a hydrogen generating material that can react with water to produce hydrogen, a method for producing the hydrogen generating material, and a method for producing hydrogen by using the hydrogen generating material as a hydrogen source.

BACKGROUND ART

With the recent widespread use of cordless equipment such as a personal computer or portable telephone, secondary batteries used as a power source of cordless equipment are increasingly required to have a smaller size and higher capacity. At present, a lithium ion secondary battery that can achieve a small size, light weight, and high energy density is being put to practical use and growing in demand as a portable power source. However, depending on the type of cordless equipment to be used, the lithium ion secondary battery is not yet reliable enough to ensure a continuous available time.

Under these circumstances, a polymer electrolyte fuel cell has been studied as an example of a battery that may meet the above requirements. The polymer electrolyte fuel cell uses a polymer electrolyte membrane as an electrolyte, oxygen in the air as a positive active material, and a fuel (hydrogen, methanol, etc.) as a negative active material, and has attracted considerable attention because it is a battery that can be expected to have a higher energy density than a lithium ion secondary battery. Fuel cells can be used continuously as long as a fuel and oxygen are supplied. Although there are several candidates for fuels used for the fuel cells, the individual fuels have various problems, and a final decision has not been made yet.

For example, when a fuel cell uses hydrogen as a fuel, a method for supplying hydrogen stored in a high-pressure tank or hydrogen-storing alloy tank is employed to some extent. However, a fuel cell using such a tank is not suitable for a portable power source, since both the volume and the weight of the fuel cell are increased, and the energy density is reduced.

When a fuel cell uses a hydrocarbon fuel, another method for extracting hydrogen by reforming the hydrocarbon fuel may be employed. However, a fuel cell using hydrocarbon fuel requires a reformer and thus poses problems such as supply of heat to the reformer and thermal insulation. Therefore, this fuel cell is not suitable for a portable power source either.

Moreover, a direct methanol fuel cell, in which methanol is used as a fuel and reacts directly at the electrode, is miniaturized easily and expected to be a future portable power source. However, a direct methanol fuel cell causes a reduction in both voltage and energy density due to a crossover phenomenon in which methanol at the negative electrode passes through the solid electrolyte and reaches the positive electrode.

On the other hand, it is also known that hydrogen is generated by a chemical reaction at a low temperature of 100° C. or less and used as a fuel of a fuel cell (Patent Documents 1 to 5). These methods use a metal that reacts with water to produce hydrogen, such as aluminum, magnesium, silicon or zinc, as a hydrogen source.

Patent Document 1: U.S. Pat. No. 6,506,360
Patent Document 2: JP 2566248 B2
Patent Document 3: JP 2004-231466 A
Patent Document 4: JP 2001-31401 A
Patent Document 5: U.S. Pat. No. 6,582,676

Patent Documents 1 to 3 disclose techniques allowing aluminum to react with an alkali or acid. Although these techniques easily can produce hydrogen chemically, the equivalent weight of the alkali or acid corresponding to aluminum needs to be added, which in turn reduces the energy density because a large proportion of the material is other than the hydrogen source. Moreover, the reaction product (oxide or hydroxide) forms a film on the surface of the aluminum, so that water cannot come into contact with the aluminum inside the film. This may lead to a problem that the oxidation reaction stops while only at the surface of the aluminum.

Patent Document 4 is intended to avoid the above problem by removing the film mechanically from the metal surface. However, the device should have mechanical equipment for removal of the film and becomes larger.

In Patent Document 5, alumina is added as a catalyst to suppress the formation of a hydroxide film, and hydrogen is generated at low temperatures. However, it is not possible to generate hydrogen by using only a metal such as aluminum. Moreover, the addition of the catalyst can reduce the content of the metal (aluminum) that serves as a hydrogen source, thus reducing the amount of hydrogen generated.

DISCLOSURE OF INVENTION

A hydrogen generating material of the present invention includes at least one metal material selected from the group consisting of aluminum and aluminum alloy. The metal material has a surface film that includes a metal phase containing aluminum in the metallic state and an inactive phase containing an oxide or hydroxide of aluminum.

A method for producing a hydrogen generating material of the present invention produces a hydrogen generating material including at least one metal material selected from the group consisting of aluminum and aluminum alloy, wherein the metal material has a surface film that includes a metal phase containing aluminum in the metallic state and an inactive phase containing an oxide or hydroxide of aluminum, the method including pulverizing aluminum or aluminum alloy in a liquid containing water and an organic solvent.

A method for producing hydrogen of the present invention includes producing hydrogen by a reaction between the hydrogen generating material of the present invention and water.

The present invention can provide a hydrogen generating material that allows hydrogen to be generated easily and efficiently, a method for producing the hydrogen generating material, and a method for producing hydrogen by using the hydrogen generating material as a hydrogen source. The use of the hydrogen generating material of the present invention as a hydrogen source can reduce the size of a hydrogen generator or fuel cell.

BEST MODE FOR CARRYING OUT THE INVENTION

The hydrogen generating material of the present invention includes at least one metal material selected from aluminum and aluminum alloy. The metal material includes a particle core composed mainly of an aluminum metal or aluminum alloy and a surface film covering the particle core. The surface film includes a metal phase containing aluminum in the metallic state and an inactive phase containing an aluminum oxide or aluminum hydroxide. The aluminum in the metallic state includes an aluminum metal or aluminum alloy. The hydrogen generating material including the metal material in the form as described above allows hydrogen to be generated rapidly and efficiently.

The metal material includes aluminum (pure aluminum) or aluminum alloy. The aluminum alloy may have any composition as long as the main component is aluminum. Examples of the alloying element include silicon, iron, copper, manganese, magnesium, zinc, nickel, titanium, lead, tin, and chromium. In view of the fact that a larger amount of hydrogen is generated by increasing the proportion of aluminum in the metal material, the content of aluminum in the aluminum alloy is preferably 80 mass % or more.

In common aluminum, the particle core of an aluminum metal is covered with a dense surface film (oxide film) consisting of an aluminum oxide or aluminum hydroxide that is in the inactive phase and not easily dissolved in water. When this aluminum reacts with water, hydrogen is generated after the water penetrates the surface film and reaches the aluminum metal in the particle core. Therefore, a general hydrogen generating material using the aluminum as a hydrogen source needs some time before starting the generation of hydrogen.

The studies conducted by the present inventors showed that when aluminum is used to produce hydrogen, the time it takes to start generating hydrogen and the time it takes for the hydrogen generation rate to reach a maximum differ significantly depending on the surface state of the aluminum particles. Specifically, it became evident that if a metal phase containing aluminum in the metallic state is present in at least a part of the surface film of the aluminum particles, both the time before starting the generation of hydrogen and the time required for maximizing the hydrogen generation rate can be reduced, compared to aluminum particles having only a dense surface film consisting of an aluminum oxide or aluminum hydroxide.

The reason for this is considered as follows. Due to the presence of the metal phase containing aluminum in the metallic state in at least a part of the surface film, water penetrates the surface film and reacts with the metal phase before reaching the aluminum metal in the particle core. This reaction can provide a starting point from which the reaction of the particle core and the water is accelerated, thus reducing both the time before starting the generation of hydrogen and the time required for maximizing the hydrogen generation rate.

The forms of the metal phase and the inactive phase in the surface film are not particularly limited. For example, at least a part of the metal phase and at least a part of the inactive phase may be formed in layers, and the surface film may include a laminated portion in which the metal phase layer and the inactive phase layer are stacked alternately. With this configuration, the reaction of the metal phase and water occurs continuously, so that the reactivity can be improved further. Moreover, the metal phase having a small particle size may be dispersed in the inactive phase.

As described above, compared to a conventional metal material of aluminum or aluminum alloy whose surface is covered with only a dense oxide film, the metal material included in the hydrogen generating material of the present invention can reduce both the time before starting the generation of hydrogen and the time required for maximizing the hydrogen generation rate because of its surface film configuration. Thus, hydrogen can be produced easily and efficiently.

It is preferable that the surface film of the metal material has pores. With this configuration, water easily penetrates the metal phase of the surface film and the aluminum metal in the particle core. For example, when pores are provided inside the laminated portion of the surface film or at the interface between the laminated portion and the particle core, those pores make it easier for water to penetrate the laminated portion and the particle core and also to react with the metal phase of the laminated portion or the aluminum metal in the particle core.

Figure 1A:
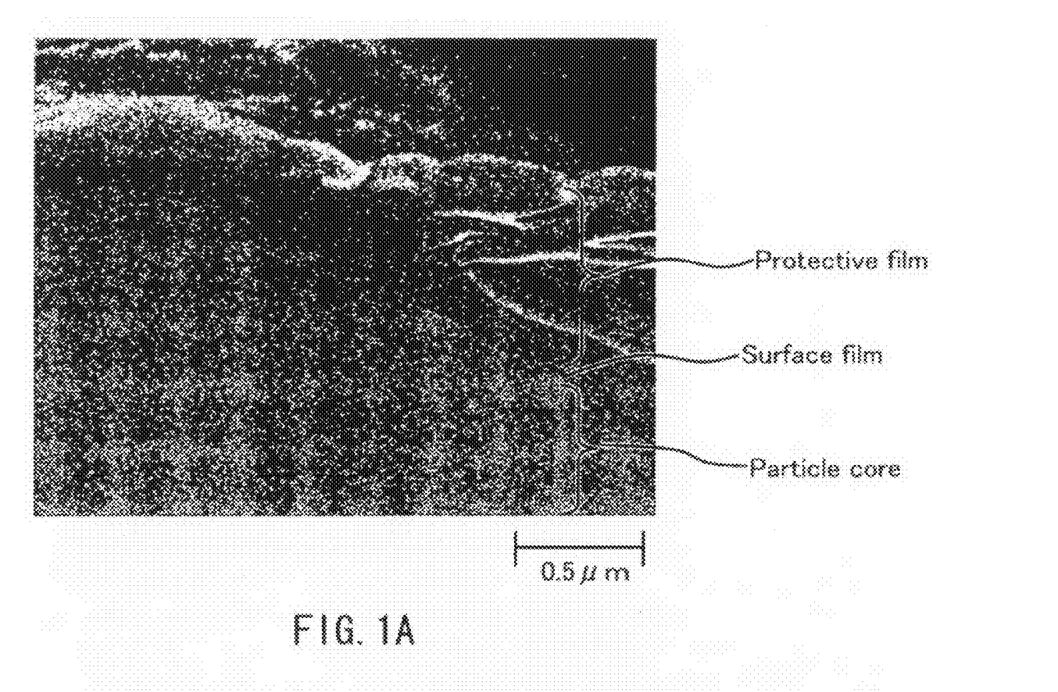
FIG. 1 shows the electron microscope observation of a cross section of a general aluminum powder used in Example 1.
Figure 1B:
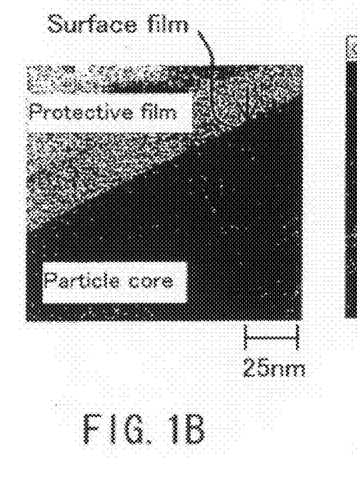
Figure 1C:
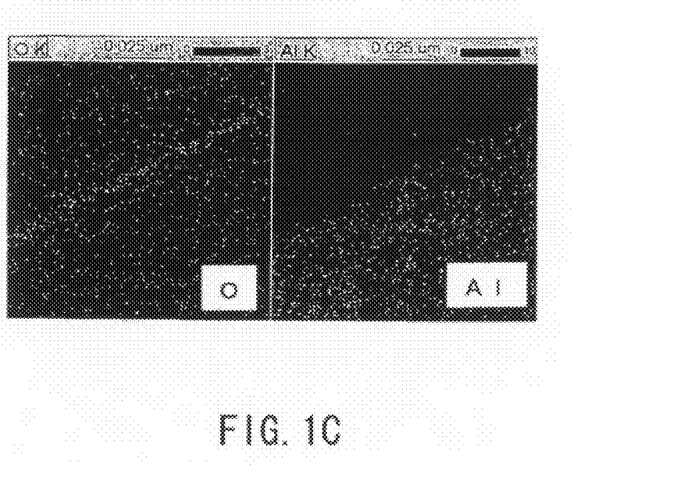
Figure 2A:
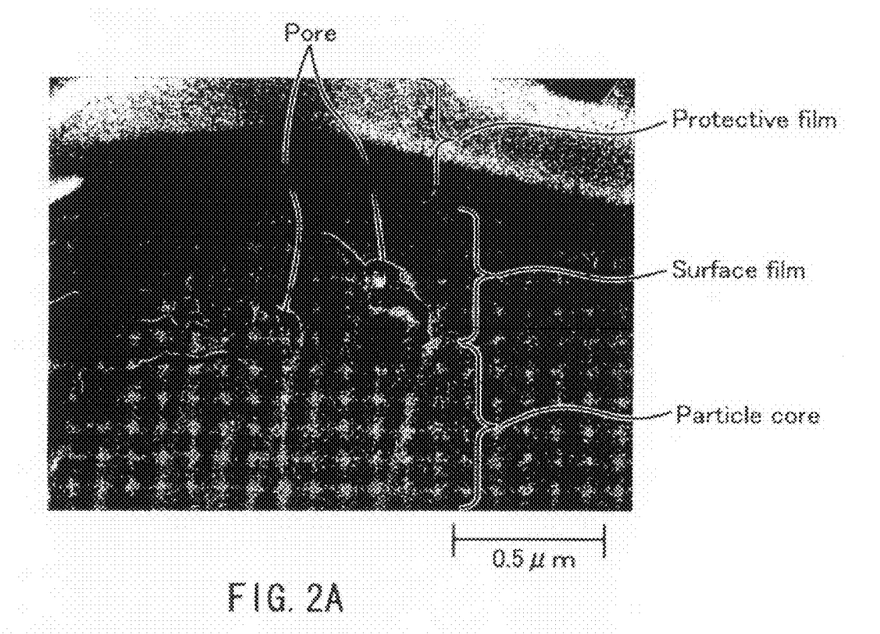
FIG. 2 shows the electron microscope observation of a cross section of a metal material used for a hydrogen generating material of the present invention that is produced in Example 1.
Figures 2B, 2C:
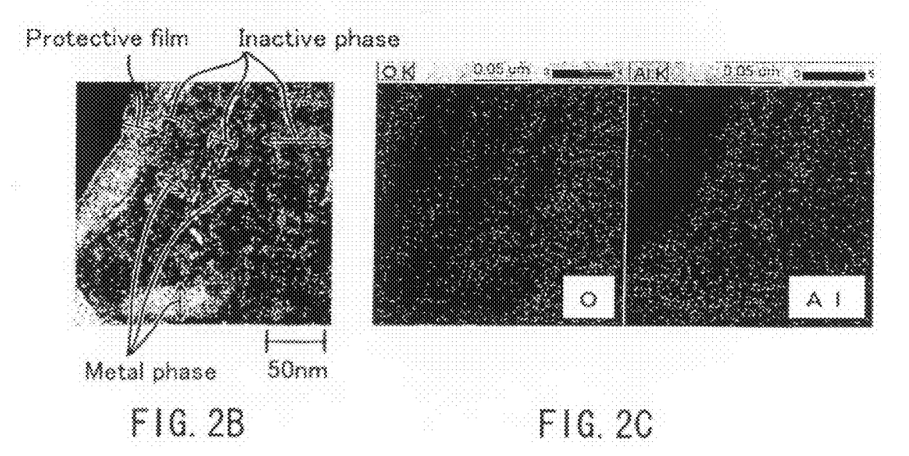

FIGS. 1A to 1C show the electron microscope observation of a cross section of a general aluminum powder used in Example 1, which will be described later. Similarly, FIGS. 2A to 2C show the electron microscope observation of a cross section of a metal material used for a hydrogen generating material of the present invention that is produced in Example 1. FIGS. 1A and 2A are scanning electron microscope (SEM) images, and FIGS. 1B and 2B are scanning transmission electron microscope (STEM) images of the cross sections. FIGS. 1C and 2C are element mappings of the visual fields in FIGS. 1B and 2B respectively, obtained by using an energy-dispersive X-ray microanalyzer (EDX).

As can be seen from FIG. 1A, a dense surface film with a thickness of about 5 nm is present on the outer surface of the particle core of the general aluminum powder. The element mapping in FIG. 1C shows that oxygen is distributed substantially only over the surface of the aluminum powder, and therefore the surface film may consist of an oxide or hydroxide of aluminum. Moreover, since the element distributed in the particle core is approximately aluminum alone, the inside may be an aluminum metal.

The "protective film" as shown in FIGS. 1A, 1B, 2A, and 2B is an analytical film attached to the particle surface for the purpose of protecting the particles from the electron microscope observation. Accordingly, a portion represented by the "surface film" is the outermost surface of the aluminum powder.

In the metal material of FIGS. 2A to 2C, as can be seen from FIG. 2A, a surface film with a thickness of about 1 μm or less is present on the outer surface of the particle core that may be composed of an aluminum metal. The element mapping of the surface film in FIG. 2C shows that layers in which oxygen is mainly distributed (i.e., layers of the inactive phase containing an aluminum oxide or aluminum hydroxide) and layers in which aluminum is mainly distributed i.e., layers of the metal phase containing aluminum in the metallic state) are stacked alternately from the outside (the protective film side) so as to form a laminated portion. In this laminated portion, the inactive phase and the metal phase are arranged in at least two layers, respectively (see FIG. 2B). Moreover, the surface film has pores (see FIG. 2A).

The laminated portion may be formed in at least a part or the whole of the surface film of the hydrogen generating material. For example, a part of the surface film may include the laminated portion and the remaining part may include only the inactive phase. Specifically, the proportion of the laminated portion area in the surface film can be expressed, e.g., by 25 to 100% of the total surface area of the hydrogen generating material.

The laminated portion of the surface film may have either a structure in which one layer of the metal phase and one layer of the inactive phase are stacked, or a structure in which at least two layers of the metal phase and at least two layers of the inactive phase are stacked alternately, as shown in FIG. 2B. Although the number of layers in the laminated portion is not particularly limited, each phase may have, e.g., four to five layers.

The thickness of the laminated portion of the surface film is preferably 2 μm or less. If the laminated portion is too thick, it may include a larger proportion of the aluminum oxide or aluminum hydroxide that is not involved in the hydrogen producing reaction, and the hydrogen generation efficiency may be reduced. The lower limit of the thickness of the laminated portion can be, e.g., 10 nm.

The metal material preferably includes 60 mass % or more, and more preferably 70 mass % or more of aluminum in the metallic state. If the content of aluminum in the metallic state is low, the amount of hydrogen generated may be reduced.

When aluminum is heated, a part of the surface reacts with water to produce hydrogen, but a stable oxide film is formed on the surface. Therefore, in the case of the so-called bulk state such as a plate, a block, or particles of 1 mm or more in size, the reaction of aluminum and water does not proceed, and the amount of hydrogen generated at room temperature is 5 mL or less per 1 g of the metal material.

Thus, the metal material used for the hydrogen generating material of the present invention may include particles with a particle size of 60 μm or less in a proportion of preferably 80 vol % or more, and more preferably 90 vol % or more. The average particle size of the metal material is preferably 30 μm or less, and more preferably 20 μm or less. The shape of the metal material is not limited to a particle, and may be like a metal foil.

The reaction of aluminum and water to produce hydrogen and an oxidation product may be expressed as any one of the following formulas (1) to (3).

$$2Al+6H_2O \rightarrow Al_2O_3.3H_2O+3H_2 \quad (1)$$

$$2Al+4H_2O \rightarrow Al_2O_3.H_2O+3H_2 \quad (2)$$

$$2Al+3H_2O \rightarrow Al_2O_3+3H_2 \quad (3)$$

With these reactions, aluminum in the bulk state is stabilized by forming an oxide film on the surface, as described above. However, when the particle size is small, the oxide film is unlikely to interfere with the reaction of aluminum in the particle core and water, so that the hydrogen producing reaction occurs continuously. In other words, the metal material having the above particle size distribution and average particle size can reduce the effect of suppressing the reaction with water due to the formation of the oxide film and thus allows hydrogen to be generated efficiently.

On the other hand, if the particle size of the metal material is excessively small, although the hydrogen generation rate is increased, it becomes difficult to handle the metal material in the air because the flammability is enhanced. Moreover, the bulk density is reduced, thus reducing the packing density of the hydrogen generating material in a hydrogen generator. Consequently, the energy density is likely to be low. Therefore, the average particle size of the metal material of the hydrogen generating material is preferably 0.1 μm or more.

In this specification, the average particle size of the metal material means a value of 50% diameter of an accumulated volume percentage, i.e., $d_{50}$. Also, the particle size distribution and the average particle size of the metal material are measured by a laser diffraction scattering method. According to this method, specifically, the measuring object is dispersed in a liquid phase such as water and irradiated with a laser beam to detect scattering intensity distribution, and the particle size distribution is measured using the scattering intensity distribution. The measuring device for the laser diffraction scattering method may be, e.g., "MICROTRAC HRA" manufactured by Nikkiso Co., Ltd.

The metal material having the surface film that includes the laminated portion can be obtained by pulverizing aluminum or aluminum alloy in a liquid containing water and an organic solvent, performing surface modification of the metal material, and subsequently removing the liquid.

The pulverization increases the surface area of aluminum or aluminum alloy used as a hydrogen source, so that the hydrogen generation rate can be improved. When aluminum is pulverized by a general mechanical grinding technique such as a stamping mill, ball mill, or vibrating mill, it is stretched in the form of a foil and broken into a scale-shaped powder having metallic luster, since aluminum is a metal with excellent malleability.

In contrast, when aluminum or aluminum alloy is pulverized mechanically in a liquid containing water and an organic solvent, a black fine granular powder is obtained as a metal material that can produce hydrogen more quickly than the aluminum powder produced by the general mechanical grinding technique. This is because such a method allows the metal material to have a surface film that includes a metal phase containing aluminum in the metallic state and an inactive phase containing an aluminum oxide or aluminum hydroxide. Moreover, by using such a method, at least a part of the metal phase and at least a part of the inactive phase are formed in layers, and the surface film may include a laminated portion in which the metal phase layer and the inactive phase layer are stacked alternately. Further, such a method also allows pores to be formed in the surface film on the particle surface.

As described above, the hydrogen generating material of the present invention is produced by using the metal material that is obtained by pulverizing aluminum or aluminum alloy in a liquid containing water and an organic solvent. When the liquid does not contain water, but contains only an organic solvent, a part or the whole of the metal material can be a scale-shaped powder having metallic luster after pulverization, and the hydrogen generation efficiency is reduced. Moreover, since the pulverized powder is likely to adhere to the inner wall of a pot or the like of a pulverizer, the intended metal material cannot be produced efficiently.

When the liquid used for pulverizing aluminum or aluminum alloy does not contain an organic solvent, but contains only water, the oxidation or hydroxylation of the surface of the metal material proceeds excessively by pulverization. Therefore, a considerable amount of oxide or hydroxide is produced to reduce the content of metallic aluminum in the metal material, and the amount of hydrogen generated is reduced. In other words, the liquid containing an organic solvent controls the oxidation or hydroxylation reaction of aluminum or aluminum alloy during pulverization and thus can adjust the thickness of the laminated portion of the surface film. The thickness of the laminated portion also may be adjusted by controlling the pulverization time.

In the liquid used for pulverizing aluminum or aluminum alloy, to provide the above surface film configuration, the content of water is preferably 0.02 parts by mass or more, and more preferably 0.1 parts by mass or more with respect to 1 part by mass of aluminum or aluminum alloy to be pulverized. On the other hand, to suppress the progress of the oxidation of aluminum or aluminum alloy during pulverization, the content of water is preferably 2 parts by mass or less, more preferably 1 part by mass or less, and most preferably 0.4 parts by mass or less. If the amount of water in the liquid is too small, the surface modification of the metal material is insufficient, and the metal material tends to be a scale-shaped powder having metallic luster, so that the hydrogen generation efficiency may be reduced. If the amount of water in the liquid is too large, the content of metallic aluminum in the metal material is reduced, which may reduce the amount of hydrogen generated.

The organic solvent of the liquid is not particularly limited as long as it is unlikely to react with aluminum or aluminum alloy. A solvent that is not mixed with water also can be used. Specific examples of the organic solvent include aromatic hydrocarbon such as toluene, aliphatic hydrocarbon such as hexane or cyclohexane, ketones such as acetone, ethers, and N,N-dimethylformamide. Among them, the organic solvent mixed with water to form an azeotropic mixture such as toluene or cyclohexane is preferred, since the liquid is removed easily from the pulverized powder. The organic solvents may be used individually or in combination of two or more. Moreover, it is possible to use alcohol with a low molecular weight (e.g., a carbon number of 10 or less) such as methanol or ethanol. The low-molecular-weight alcohol is a solvent having higher reactivity with aluminum than the above organic solvents and may react with aluminum to produce alkoxide depending on the conditions. However, compared to water, the reactivity of the alcohol with aluminum is significantly low. Accordingly, the alcohol can be used instead of or together with any of the organic solvents as indicated above.

In the liquid used for pulverizing aluminum or aluminum alloy, the ratio of water to an organic solvent is not necessarily limited. For example, to suppress the progress of the oxidation of the metal material appropriately, the amount of the organic solvent is preferably 5 parts by mass or more with respect to 1 part by mass of water. On the other hand, to improve the effect of surface modification, the amount of the organic solvent is preferably 300 parts by mass or less.

The method for pulverizing aluminum or aluminum alloy in the liquid containing water and an organic solvent is not particularly limited, and a mechanical grinding technique using, e.g., a ball mill, sand mill, vibrating mill, or jet mill can be used. When the metal material of the hydrogen generating material of the present invention is produced, hydrogen is generated in the process of pulverization. Therefore, it is desirable that each of the above pulverizers has a mechanism for releasing such hydrogen.

The hydrogen generating material of the present invention is produced by using the metal material thus obtained. As described above, the metal material preferably includes 60 mass % or more, and more preferably 70 mass % or more of aluminum in the metallic state. If the content of aluminum in the metallic state is low, the amount of hydrogen generated may be reduced. In the present invention, aluminum is pulverized in the liquid containing water, and therefore it is difficult to maintain all the aluminum elements of the metal material in the metallic state. However, the liquid also contains an organic solvent so as to limit the content of water, thereby controlling the oxidation of aluminum or aluminum alloy during pulverization. Thus, the present invention can provide a hydrogen generating material by using the metal material that includes a large amount of aluminum in the metallic state and allows hydrogen to be generated efficiently.

In this specification, the content of aluminum (aluminum metal or aluminum alloy) in the metallic state in the metal material can be measured as follows. When the metal material is analyzed with an X-ray diffractometer, an aluminum metal and aluminum hydroxide are observed. Then, the contents of aluminum elements and oxygen elements in the metal material are measured by X-ray fluorescence analysis (XRF). Subsequently, the content of the aluminum hydroxide is determined from the content of the oxygen elements, and the remainder is identified as the content of aluminum in the metallic state.

The pulverization of aluminum or aluminum alloy in the liquid may result in a substantially spherical or irregularly granular metal material. Such a metal material is thicker than scale-shaped particles produced by a general mechanical powdering method.

The hydrogen generating material of the present invention can be configured by mixing the metal material and a heat generating material or an additive, which will be described later. However, since the metal material has good reactivity with water, even if the heat generating material or additive is reduced in amount or eliminated, hydrogen can be generated easily and efficiently, and the energy density also can be improved.

There is no particular limitation to the form of the hydrogen generating material. For example, the hydrogen generating material may remain in the form of a powder (particle), which is the same as the metal material takes, and preferably may be molded into a pellet or granules. When a powdery hydrogen generating material is formed into a pellet by compression molding, the packing density is increased and the volume is reduced, resulting in a high energy density. For granulation, the hydrogen generating material is granulated, e.g., into millimeter-size granules, thereby increasing the hydrogen generation rate.

As will be described in detail later, it is preferable that the hydrogen generating material of the present invention is heated while reacting with water. In such a case, the hydrogen generating material may be heated externally. Moreover, a heat generating material that generates heat by reacting with water may coexist with the hydrogen generating material when it reacts with water, so that heat generated by the reaction of this heat generating material and the water can be used. Therefore, it is also preferable that the hydrogen generating material includes the heat generating material. The heat generating material may be, e.g., an oxide etc. of alkali metals or alkaline-earth metals that generate heat by a reaction with water or hydration, such as calcium oxide, magnesium oxide, calcium chloride, magnesium chloride, or calcium sulfate. Moreover, a metal powder that generates heat by reacting with oxygen such as an iron powder can be used as the heat generating material.

When the hydrogen generating material includes the heat generating material, in view of a higher hydrogen generation rate, the content of the heat generating material is preferably 1 mass % or more, and more preferably 3 mass % or more with respect to the total mass of the hydrogen generating material. In view of the amount of hydrogen generated, the content of the heat generating material is preferably 15 mass % or less, and more preferably 10 mass % or less with respect to the total mass of the hydrogen generating material.

When the hydrogen generating material includes the heat generating material, it is preferable that the hydrogen generating material is molded into a pellet or granules along with the heat generating material.

The hydrogen generating material of the present invention may include various additives for different purposes.

The additives such as hydrophilic oxides (alumina, silica, magnesia, zinc oxide, etc.), carbon, and water absorbing polymers (carboxymethyl cellulose, polyvinyl alcohol, polyethylene glycol, etc.) can be included in the hydrogen generating material to produce hydrogen more efficiently. These additives may be used individually or in combination of two or more. The additives have the effects of, e.g., improving contact between the metal material and water, preventing the reaction product obtained by the reaction of the metal material and water from coagulating with the unreacted metal material, and allowing water to penetrate into a pellet when the hydrogen generating material is in the form of a pellet, as will be described later. Because of these effects, hydrogen can be generated efficiency.

When various additives are used, in view of the hydrogen generation efficiency, the content of the additive is preferably 1 mass % or more, and more preferably 10 mass % or more with respect to the total mass of the hydrogen generating material. In view of the amount of hydrogen generated, the content of the additive is preferably 30 mass % or less, and more preferably 20 mass % or less with respect to the total mass of the hydrogen generating material.

The hydrogen generating material and its manufacturing method have been described above. Next, a method for producing hydrogen by using the hydrogen generating material of the present invention and a hydrogen generator will be described.

The hydrogen generating material of the present invention is brought into contact with water to produce hydrogen. To improve the reactivity and achieve the hydrogen generation rate at a predetermined level or more, it is desirable that the reaction is accelerated by external heating. The heating temperature is preferably 40° C. or more, but 95° C. or less to prevent the evaporation of water. The heating process is not particularly limited as long as the hydrogen generating material is kept within the above temperature range. For example, a vessel containing the hydrogen generating material and water may be heated externally by electrical heating that uses a resistor through which electricity passes or chemical heating that utilizes an exothermic reaction.

Examples of the source of heat for chemical heating include various compounds that have been referred to as the heat generating material that generates heat by reacting with water. The heat generated by the reaction of the heat generating material and water may be used to heat a reactor containing the hydrogen generating material. Alternatively, the heat generating material may be placed in a reactor along with the hydrogen generating material and allowed to generate heat in the reactor so that the hydrogen generating material is heated directly. In this case, the amount of the heat generating material used may be substantially the same as the suitable content of the heat generating material when it is included in the hydrogen generating material beforehand, as described above. That is, the amount of the heat generating material used is preferably 1 to 30 mass % with respect to the sum of the masses of the hydrogen generating material and the heat generating material.

The reaction of aluminum or aluminum alloy and water is an exothermic reaction. Therefore, when heat of the reaction is prevented from dissipating and used to increase the temperature of the hydrogen generating material and water, hydrogen can be generated continuously without requiring a source of heat.

Moreover, it is possible to control the amount of hydrogen generated by controlling the supply of water that is to react with the hydrogen generating material.

The hydrogen generating material of the present invention can serve as a hydrogen source in a hydrogen generator. The hydrogen generator may include a vessel for containing the hydrogen generating material and water and have a mechanism for causing the reaction between the hydrogen generating material and water in the vessel and extracting the hydrogen produced. The vessel of the hydrogen generator may include the above heating means for heating the hydrogen generating material and water externally and also can accelerate the generation of hydrogen as needed. In such a case, the amount of hydrogen generated can be controlled by controlling the heating temperature.

Figure 5:
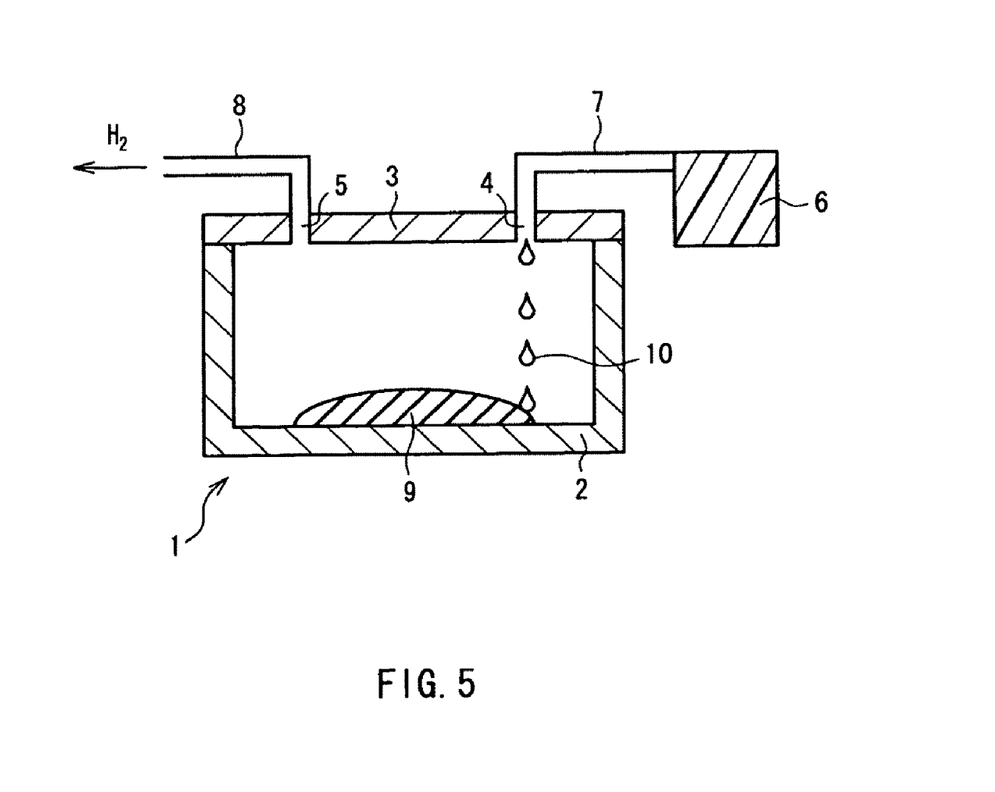
FIG. 5 is a schematic cross-sectional view showing the structure of a hydrogen generator.

Although the form and shape of the vessel is not particularly limited, it is desirable that the vessel has a water inlet and a hydrogen outlet and can be hermetically sealed to prevent a leakage of water and hydrogen. The suitable material for the vessel is substantially impermeable to water and hydrogen and does not cause any failure of the vessel even if it is heated at about 100° C. For example, heat-resistance glass, metals such as titanium and nickel, and resins such as polyethylene and polypropylene can be used. FIG. 5 is a schematic cross-sectional view of an example of the hydrogen generator. In FIG. 5, the hydrogen generator 1 includes a vessel 2 and a lid 3, and the lid 3 has an inlet 4 through which water is supplied and an outlet 5 through which hydrogen is exhausted. The inlet 4 and a tubular pump 6 are connected by a supply pipe 7. An exhaust pipe 8 is connected to the outlet 5. The hydrogen generating material 9 is placed in the vessel 2. While water 10 is supplied continuously to the hydrogen generator 1 with the tubular pump 6, the hydrogen generating material 9 and the water 10 react to produce hydrogen. This hydrogen ($H_2$) can be drawn from the exhaust pipe 8 connected to the outlet 5. The tubular pump 6 may be formed by using a closed container made of a resin sheet.

It is preferable that the hydrogen outlet 5 of the hydrogen generator is provided with a filter to prevent the contents of the vessel 2 from getting out. The filter is not particularly limited as long as it transmits gas and substantially rejects liquid and solid. For example, the filter may be either a porous gas-liquid separation film made of polytetrafluoroethylene and used in a fuel cell or the like, or a porous film made of polypropylene and used as a separator of a battery.

In the hydrogen generator 1, it is desirable that water is supplied to the inside of the vessel 2 so that the flow rate can be controlled. As described above, the amount of hydrogen generated can be controlled by controlling the supply of water.

Hydrogen generated using the hydrogen generating material of the present invention includes neither CO nor $CO_2$, with which there has been a problem of hydrogen produced by reforming a hydrocarbon fuel. Therefore, even if the hydrogen is applied to a polymer electrolyte fuel cell that operates at 100° C. or less, the fuel cell is not affected by poisoning due to the above gas. Moreover, since the hydrogen producing reaction involves water, the hydrogen gas generated includes a moderate amount of moisture and is very useful for the fuel cell that uses hydrogen as a fuel.

Hereinafter, the present invention will be described in detail by way of examples.

Experiment 1

Preparation of a Metal Material and a Hydrogen Generating Material and a Hydrogen Generation Test Working Example 1

In a grinding pot of a planetary ball mill were placed 5 g of aluminum powder with an average particle size of 55 µm that was produced by an atomizing method, 15 g of toluene, 1 g of water (0.2 parts by mass with respect to 1 part by mass of the aluminum powder), and 85 g of zirconia beads (particle size: 2 µm), and the aluminum powder was pulverized at a rotational speed of 200 rpm. Since hydrogen was generated during pulverization, the pot was rotated for 10 minutes, stopped temporarily to release the hydrogen generated inside, and then restarted its rotation. While this procedure was repeated, the pot was rotated for a total of 1 hour. Subsequently, the toluene and the water were removed by drying under reduced pressure, thus producing a metal material used for the hydrogen generating material of the present invention. The metal material lost metallic luster of the surface and appeared dark brown in color, and was in the form of irregular granular powder with an average particle size of 12 µm. The average particle size of the metal material was measured with "MICROTRAC HRA" manufactured by Nikkiso Co., Ltd. When the content of metallic aluminum in the metal material was measured in such a manner as described above, it was 80 mass %. The content of metallic aluminum in the aluminum powder (raw material powder) produced by the atomizing method also was measured in the same manner, and the result was 99 mass % or more.

FIGS. 1A to 1C show the electron microscope observation of a cross section of the aluminum powder produced by the atomizing method and used as a material for producing the metal material in Example 1. Similarly, FIGS. 2A to 2C show the electron microscope observation of a cross section of the metal material produced in Example 1. As described above, FIGS. 1A and 2A are scanning electron microscope (SEM) images, and FIGS. 1B and 2B are scanning transmission electron microscope (STEM) images of the cross sections. FIGS. 1C and 2C are element mappings of the visual fields in FIGS. 1B and 2B respectively, obtained by using an energy-dispersive X-ray microanalyzer (EDX).

As described above, in the aluminum powder (raw material powder) of FIGS. 1A to 1C, a dense surface film with a thickness of about 5 nm in which oxygen was mainly distributed was present on the outer surface of the particle core in which aluminum was mainly distributed. In other words, the particle core that may be composed of an aluminum metal was covered with the surface film that may be regarded as an oxide film.

In the metal material of FIGS. 2A to 2C, layers in which oxygen was mainly distributed (i.e., layers of the inactive phase containing an aluminum oxide or aluminum hydroxide) and layers in which aluminum was mainly distributed i.e., layers of the metal phase containing aluminum in the metallic state) were stacked alternately on the outer surface of the particle core in which aluminum was mainly distributed (i.e., particle-core composed of an aluminum metal). Thus, the surface film of the metal material included a laminated portion of a plurality of layers with different phases and had a thickness of about 1 µm or less.

A hydrogen generation test was conducted by using the metal material alone as the hydrogen generating material. First, 1 g of the metal material and 10 g of water were put in a sampling bottle, and a resistor was located outside the sampling bottle. The sampling bottle was heated at 50° C. with the resistor, and hydrogen was generated and then collected by a water-displacement method. Thus, the amount of hydrogen generated was measured.

Comparative Example 1

A hydrogen generation test was conducted in the same manner as Working Example 1 except that the aluminum powder used as a raw material in Working Example 1 was applied to the hydrogen generating material, and the amount of hydrogen generated was measured.

In the hydrogen generating materials of Working Example 1 and Comparative Example 1, the amount of the collected hydrogen was measured every two minutes, thereby determining the time it took to start generating hydrogen from the beginning of the test. Moreover, the hydrogen generation rate was obtained from a change in the amount of the collected hydrogen over time, thereby determining the time it took for the hydrogen generation rate to reach a maximum. Table 1 shows the results.

TABLE 1

| | Metal material | | Hydrogen generation test | |
| --- | --- | --- | --- | --- |
| | Average particle size (µm) | Content of metallic aluminum in aluminum (mass %) | Time before starting the generation of hydrogen (min) | Time required for maximizing the hydrogen generation rate (min) |
| Working Example 1 | 12 | 80 | 6 | 14 |
| Comparative Example 1 | 55 | 90 or more | 27 | 48 |

As is evident from Table 1, the metal material of Working Example 1 that was produced by pulverizing the aluminum powder in the liquid containing water and an organic solvent reduced both the time before starting the generation of hydrogen and the time required for maximizing the hydrogen generation rate significantly, compared to the raw material powder used as the metal material in Comparative Example 1. In view of the particle cross-sectional images in FIGS. 2A to 2C, the reason for this is considered as follows. Due to the presence of the laminated portion including the metal phase and the inactive phase in a part of the surface film, water penetrates the surface film and reacts with the metal phase before reaching the aluminum metal in the particle core. This reaction can provide a starting point from which the reaction of the particle core and the water is accelerated, thus achieving a significant reduction in both the time before starting the generation of hydrogen and the time required for maximizing the hydrogen generation rate. Moreover, the pores inside the laminated portion observed in the metal material of Working Example 1 also may be one of the factors that contribute to the significant reduction in both the time before starting the generation of hydrogen and the time required for maximizing the hydrogen generation rate.

Working Example 2

A metal material was produced in the same manner as Working Example 1 except that the amount of water used for pulverizing the aluminum powder was changed to 0.5 g (0.1 parts by mass with respect to 1 part by mass of the aluminum powder). Subsequently, a hydrogen generation test was conducted, and the amount of hydrogen generated was measured in the same manner as Working Example 1.

Working Example 3

A metal material was produced in the same manner as Working Example 1 except that the amount of the aluminum powder was changed to 3 g, and the amount of water used for pulverizing the aluminum powder was changed to 3 g (1 part by mass with respect to 1 part by mass of the aluminum powder). Subsequently, a hydrogen generation test was conducted, and the amount of hydrogen generated was measured in the same manner as Working Example 1.

Working Example 4

A metal material was produced in the same manner as Working Example 1 except that the amount of the aluminum powder was changed to 1 g, and the amount of water used for pulverizing the aluminum powder was changed to 3 g (3 parts by mass with respect to 1 part by mass of the aluminum powder). Subsequently, a hydrogen generation test was conducted, and the amount of hydrogen generated was measured in the same manner as Working Example 1.

Working Example 5

A metal material was produced in the same manner as Working Example 1 except that the total rotation time of the grinding pot was changed to 10 minutes. Subsequently, a hydrogen generation test was conducted, and the amount of hydrogen generated was measured in the same manner as Working Example 1.

Working Example 6

A metal material was produced in the same manner as Working Example 1 except that the amount of water used for pulverizing the aluminum powder was changed to 0.05 g (0.01 parts by mass with respect to 1 part by mass of the aluminum powder). Subsequently, a hydrogen generation test was conducted, and the amount of hydrogen generated was measured in the same manner as Working Example 1.

Working Example 7

A hydrogen generating material was produced by mixing 0.9 g of the metal material produced in Working Example 1 and 0.1 g of alumina with an average particle size of 1 μm in a mortar. Using this hydrogen generating material, a hydrogen generation test was conducted, and the amount of hydrogen generated was measured in the same manner as Working Example 1.

Working Example 8

A hydrogen generating material was produced by mixing 0.93 g of the metal material produced in Working Example 1 and 0.07 g of carbon ("Vulcan XC-72R", manufactured by Cabot Corporation). Using this hydrogen generating material, a hydrogen generation test was conducted, and the amount of hydrogen generated was measured in the same manner as Working Example 1.

Working Example 9

A hydrogen generating material was produced by mixing 0.96 g of the metal material produced in Working Example 1 and 0.04 g of carboxymethyl cellulose (manufactured by Daicel Chemical Industries, Ltd.). Using this hydrogen generating material, a hydrogen generation test was conducted, and the amount of hydrogen generated was measured in the same manner as Working Example 1.

Comparative Example 2

A metal material was produced in the same manner as Working Example 1 except that the liquid used for pulverizing the aluminum powder included only 16 g of water. Subsequently, a hydrogen generation test was conducted, and the amount of hydrogen generated was measured in the same manner as Working Example 1.

Comparative Example 3

A metal material was produced in the same manner as Working Example 1 except that the liquid used for pulverizing the aluminum powder included only 15 g of toluene. Subsequently, a hydrogen generation test was conducted, and the amount of hydrogen generated was measured in the same manner as Working Example 1.

In Working Examples 1 to 9 and Comparative Examples 2 and 3, the hydrogen generation test was carried out for 20 hours, and the amount of the collected hydrogen was measured every two minutes during this period of time. Then, the time it took to start generating hydrogen from the beginning of the test and the total amount of hydrogen generated in the test were determined. Moreover, the hydrogen generation rate was obtained from a change in the amount of the collected hydrogen over time, and the time it took for the hydrogen generation rate to reach a maximum and the maximum value also were determined. Tables 2 and 3 show the results.

In Working Examples 2 to 9 and Comparative Examples 2 and 3, the average particle size of the metal material and the content of metallic aluminum in the metal material were measured in the same manner as Working Example 1. Table 2 also shows the results.

Figure 3:
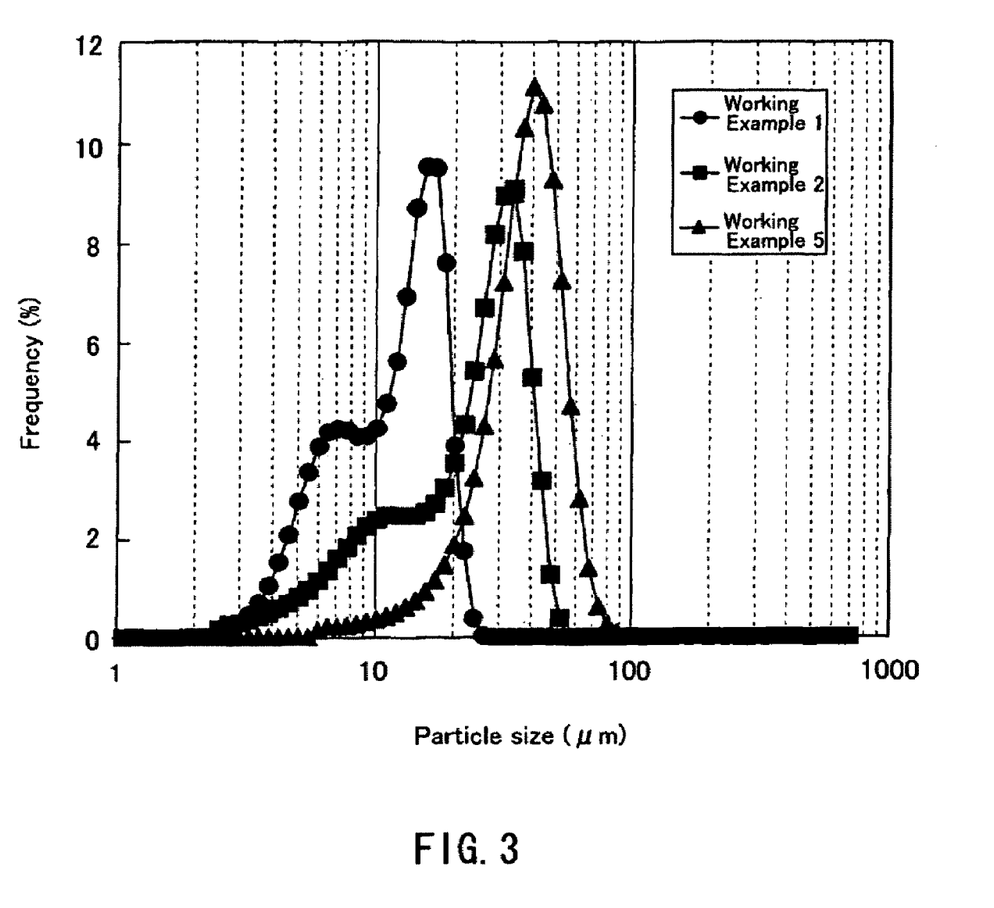
FIG. 3 shows a particle size distribution of metal materials in Examples 1, 2 and 5.

FIG. 3 shows a graph of the particle size distribution of the metal materials in Working Examples 1, 2 and 5, plotting the particle size (μm) of the metal material as the horizontal axis and frequency (vol %) as the vertical axis. As shown in FIG. 3, the proportion of particles with a particle size of 60 μm or less in each of the metal materials in Working Examples 1, 2 and 5 was 80 mass % or more.

TABLE 2

| | Metal material | | Hydrogen generation test | |
| --- | --- | --- | --- | --- |
| | Average particle size (μm) | Content of metallic aluminum in aluminum (mass %) | Time before starting the generation of hydrogen (min) | Time required for maximizing the hydrogen generation rate (min) |
| Working Example 1 | 12 | 80 | 6 | 14 |
| Working Example 2 | 20 | 87 | 6 | 13 |
| Working Example 3 | 6 | 71 | 5 | 11 |
| Working Example 4 | 3 | 23 | 3 | 8 |

TABLE 2-continued

|  | Metal material | | | Hydrogen generation test | |
|---|---|---|---|---|---|
|  | Average particle size (μm) | Content of metallic aluminum in aluminum (mass %) | Time before starting the generation of hydrogen (min) | Time required for maximizing the hydrogen generation rate (min) | |
| Working Example 5 | 37 | 42 | 8 | 13 |
| Working Example 6 | 20 | 95 | 20 | 40 |
| Working Example 7 | 12 | 80 | 6 | 15 |
| Working Example 8 | 12 | 80 | 6 | 15 |
| Working Example 9 | 12 | 80 | 20 | 35 |
| Comparative Example 2 | 2 | 3 | 3 | — |
| Comparative Example 3 | 22 | 99 or more | 40 | — |

TABLE 3

|  | Hydrogen generation test | |
|---|---|---|
|  | Amount of hydrogen generated (mL) | Maximum hydrogen generation rate (mL/min) |
| Working Example 1 | 937 | 23 |
| Working Example 2 | 755 | 15 |
| Working Example 3 | 801 | 24 |
| Working Example 4 | 239 | 7 |
| Working Example 5 | 576 | 5 |
| Working Example 6 | 45 | 1 or less |
| Working Example 7 | 943 | 24 |
| Working Example 8 | 950 | 20 |
| Working Example 9 | 958 | 30 |
| Comparative Example 2 | 17 | 1 or less |
| Comparative Example 3 | 10 | 1 or less |

In each of the hydrogen generating materials of Working Examples 1 to 9 that were produced by pulverizing the aluminum powder in the liquid containing water and an organic solvent, the time before starting the generation of hydrogen and the time required for maximizing the hydrogen generation rate became shorter than those of the hydrogen generating material in Comparative Example 1. Thus, the hydrogen generating materials of Working Examples 1 to 9 easily reacted with water to produce hydrogen. However, they varied in the amount of hydrogen generated and the maximum hydrogen generation rate, since the particle size distribution, the form of the surface film, or the like differed depending on the treatment conditions of the metal material.

Compared to the hydrogen generating material of Working Example 1, the hydrogen generating materials of Working Examples 2 and 5 had a smaller amount of hydrogen generated and a lower hydrogen generation rate. This is because the surface area may be reduced, since the particle size of each of the metal materials of Working Examples 2 and 5 is larger than that of the metal material of Working Example 1, as shown in FIG. 3. In the hydrogen generating material of Working Example 3, the hydrogen generation rate was increased, while the amount of hydrogen generated was reduced. This is because the reaction area may be increased as the particle size of the metal material is smaller, thus improving the hydrogen generation rate. However, due to a large amount of water added in the pulverizing process, the oxidation of aluminum proceeds, so that aluminum in the metallic state may be decreased. In the hydrogen generating material of Working Example 4, the proportion of water added in the pulverizing process was larger than that in Working Example 3. Therefore, the oxidation of aluminum proceeded further, and the amount of hydrogen generated and the hydrogen generation rate were reduced, compared to the hydrogen generating material of Working Example 1. Accordingly, not only the content of metallic aluminum, buy also the amount of hydrogen generated and the hydrogen generation rate can be controlled by changing the ratio of aluminum to water in the pulverizing process. It is also clear that the particle size of the metal material can be controlled by changing the ratio of aluminum to water in the pulverizing process. Moreover, the result of Working Example 5 shows that the particle size of the metal material also can be controlled by changing the pulverization time. By controlling these pulverization conditions, the particle size of the metal material can be controlled, and thus the amount of hydrogen generated and the hydrogen generation rate can be controlled.

The metal material of Working Example 6 was produced by reducing the proportion of water in the liquid used for pulverizing the aluminum powder. Most of the metal material after pulverization adhered to the surface of the grinding pot. Moreover, a part of the metal material resulted in a scale-shaped powder having metallic luster. In the hydrogen generation test using this metal material as the hydrogen generating material, the metal material was floating in the water and not likely to react with the water. Thus, the amount of hydrogen generated was smaller in Working Example 6 than in Working Example 1. In contrast, the metal materials of Working Examples 1 to 5 and 7 to 9 sank in the water and exhibited good affinity with the water.

In Working Example 7, the hydrogen generating material included alumina as an additive, and the content of the metal material was reduced to 90 mass %, compared to the hydrogen generating material of Working Example 1. However, since the alumina accelerated the reaction to increase the reaction rate of aluminum in the metal material, the amount of hydrogen generated and the hydrogen generation rate were substantially equal to those in Working Example 1. This is because the addition of alumina may prevent coagulation of the reaction product of the metal material with the unreacted metal material. Similarly, the hydrogen generating material including carbon as an additive in Working Example 8 and the hydrogen generating material including carboxymethyl cellulose (water absorbing polymer) as an additive in Working Example 9 ensured that the amount of hydrogen generated and the hydrogen generation rate were equal to or greater than those in Working Example 1, although the content of the metal material was reduced. Consequently, it is clear that carbon and the water absorbing polymer in the hydrogen generating material also have the same effect as alumina used in Working Example 7.

In Comparative Example 2, the aluminum powder was pulverized in the liquid containing only water, so that most of the aluminum reacted with water and was oxidized during the pulverizing process. Thus, only a small amount of hydrogen was obtained in the hydrogen generation test.

In Comparative Example 3, the aluminum powder was pulverized in the liquid that did not contain water but only an organic solvent. As a result, the amount of pulverized powder adhering to the surface of the grinding pot or the proportion of a scale-shaped powder having metallic luster was increased further, compared to Working Example 6. When the hydrogen generation test was conducted with this pulverized powder, it was floating in the water, and the amount of hydrogen generated was reduced significantly. While the metal materials of Working Examples 1 to 5 were in the form of irregular granules, the pulverized powder of Comparative Example 3 was in the form of a scale and also had different surface properties. This may affect a difference in the generation of hydrogen.

Figure 4:
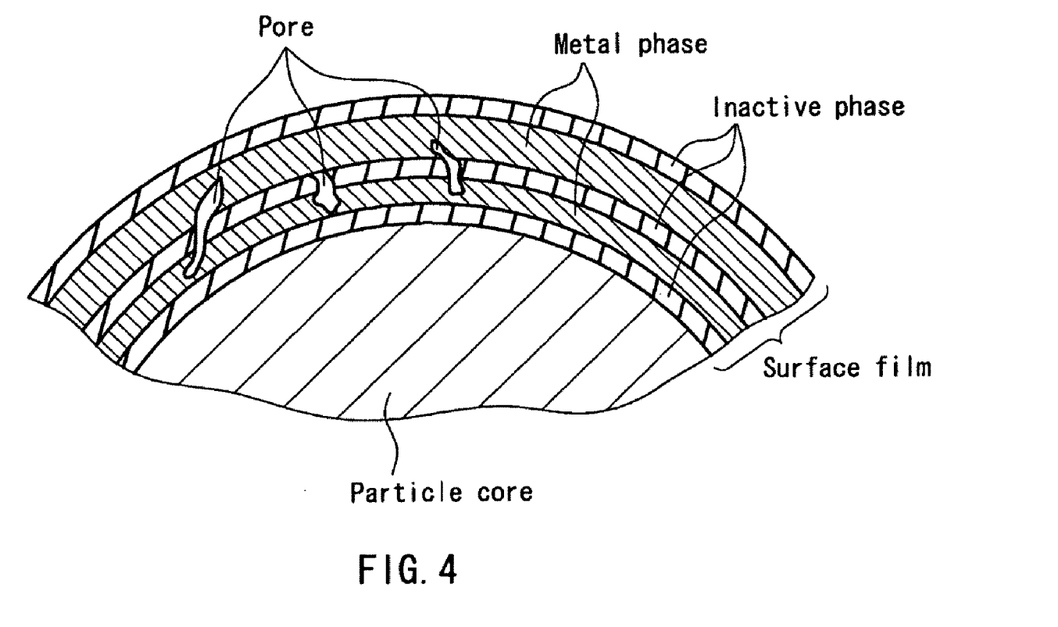
FIG. 4 is a schematic cross-sectional view showing the structure of a surface film of metal materials in Examples 2 to 6.

Each of the metal materials of Working Examples 2 to 6 was analyzed in the depth direction for both the peak derived from the metallic state of aluminum and the 2p peak derived from an oxide (or hydroxide) by observing the cross section of the metal material with an electron microscope or by using X-ray photoelectron spectroscopy (XPS) while the surface of the metal material was etched with Ar. The results confirmed that the surface film including a laminated portion with a structure as shown in the schematic view of FIG. 4 was present on the surface of each of the metal materials.

Working Example 10

The amount of hydrogen generated was measured in the same manner as Working Example 1 except that the temperature of the sampling bottle was changed to 45° C. in a hydrogen generation test.

Working Example 11

The amount of hydrogen generated was measured in the same manner as Working Example 1 except that the temperature of the sampling bottle was changed to 40° C. in a hydrogen generation test.

Table 4 shows the amount of hydrogen generated and the maximum hydrogen generation rate in Working Examples 10 and 11.

TABLE 4

| | Metal material | | Hydrogen generation test | | |
|---|---|---|---|---|---|
| | Average particle size (μm) | Content of metallic aluminum in aluminum (mass %) | Heating temperature (° C.) | Amount of hydrogen generated (mL) | Maximum hydrogen generation rate (mL/min) |
| Working Example 1 | 12 | 80 | 50 | 937 | 23 |
| Working Example 10 | 12 | 80 | 45 | 873 | 8 |
| Working Example 11 | 12 | 80 | 40 | 854 | 3 |

In Working Examples 10 and 11, even if the heating temperature of the sampling bottle was changed in the hydrogen generation test, the generation of hydrogen was confirmed. When the hydrogen generating material was heated at 40° C. or more, the amount of hydrogen generated and the hydrogen generation rate were increased significantly. In Working Example 1, the sampling bottle was heated at 50° C., and the hydrogen generation rate reached to a maximum 14 minutes after the heating started. Then, the hydrogen generation rate was reduced abruptly. In Working Examples 10 and 11, the sampling bottles were heated at 45° C. and 40° C., respectively, and hydrogen was generated stably for a long time, although the hydrogen generation rate was lower than that in Working Example 1. Therefore, the hydrogen generation rate also may be controlled by controlling the heating temperature.

Experiment 2

A Hydrogen Generation Test with a Hydrogen Generator

Working Example 12

1 g of a metal material produced in the same manner as Working Example 1 was placed in a glass vessel with a 50 mL capacity, as shown in FIG. 5. This vessel was closed with a lid having a water inlet and a hydrogen outlet. A resistor was located outside the vessel as a heating means. While the vessel was heated at 50° C. by allowing electricity to pass through the resistor, water was supplied at 0.02 mL/min from the inlet by using a tubular pump. Like Working Example 1, the generation of hydrogen was confirmed. Moreover, it was also confirmed that when the supply of water was stopped, the hydrogen generation was stopped after several minutes.

Working Example 13

It was confirmed that when the heating was stopped, instead of stopping the supply of water in Example 12, and then the vessel was cooled, the hydrogen generation was stopped after several minutes.

Experiment 3

Production of a Polymer Electrolyte Fuel Cell

Hydrogen was generated in the same manner as Working Example 1, and a discharge test was conducted by supplying the generated hydrogen to a polymer electrolyte fuel cell. Consequently, the polymer electrolyte fuel cell provided an output as high as 200 mW/cm$^2$ at room temperature. This makes it clear that the hydrogen generating material of the present invention is effective as a fuel source of a small portable fuel cell.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

As described above, the present invention can provide a hydrogen generating material that allows hydrogen to be generated easily and efficiently, a method for producing the hydrogen generating material, and a method for producing hydrogen by using the hydrogen generating material as a hydrogen source. The use of the hydrogen generating material of the present invention as a hydrogen source can reduce the size of a hydrogen generator or fuel cell.

The invention claimed is:

1. A hydrogen generating material comprising:
at least one metal material selected from the group consisting of aluminum and aluminum alloy,
wherein the metal material has a surface film that includes a metal phase containing aluminum in a metallic state and an inactive phase containing an oxide or hydroxide of aluminum, and wherein the surface film includes a laminated portion in which a layer of the metal phase and a layer of the inactive phase are stacked alternately.

2. The hydrogen generating material according to claim 1, wherein at least two layers of the metal phase and at least two layers of the inactive phase are stacked in the laminated portion.

3. The hydrogen generating material according to claim 1, wherein the laminated portion has a thickness of 2 μm or less.

4. The hydrogen generating material according to claim 1, wherein the surface film has pores.

5. The hydrogen generating material according to claim 1, wherein the metal material includes particles with a particle size of 60 μm or less in a proportion of 80 vol % or more.

6. The hydrogen generating material according to claim 1, wherein the metal material has an average particle size of 30 μm or less.

7. The hydrogen generating material according to claim 1, wherein the metal material includes 60 mass % or more of aluminum in the metallic state.

8. The hydrogen generating material according to claim 1, further comprising a heat generating material that generates heat by reacting with water.

9. The hydrogen generating material according to claim 1, further comprising at least one additive selected from the group consisting of a hydrophilic oxide, carbon, and a water absorbing polymer.

10. A method for producing a hydrogen generating material comprising at least one metal material selected from the group consisting of aluminum and aluminum alloy,
    wherein the metal material has a surface film that includes a metal phase containing aluminum in a metallic state and an inactive phase containing an oxide or hydroxide of aluminum, and
    wherein the surface film includes a laminated portion in which a layer of the metal phase and a layer of the inactive phase are stacked alternately,
    the method comprising:
    pulverizing aluminum or aluminum alloy in a liquid containing water and an organic solvent.

11. The method for producing a hydrogen generating material according to claim 10, wherein a content of water in the liquid is 0.02 to 2 parts by mass with respect to 1 part by mass of aluminum or aluminum alloy.

12. The method for producing a hydrogen generating material according to claim 10, wherein a content of water in the liquid is 0.1 to 1 parts by mass with respect to 1 part by mass of aluminum or aluminum alloy.

13. The method for producing a hydrogen generating material according to claim 10, wherein the organic solvent includes toluene.

14. The method for producing a hydrogen generating material according to claim 10, further comprising adding a heat generating material that generates heat by reacting with water to the pulverized aluminum or aluminum alloy.

15. The method for producing a hydrogen generating material according to claim 10, wherein the surface film has pores.

16. A method for producing hydrogen comprising:
    producing hydrogen by a reaction between the hydrogen generating material according to claim 1 and water.

17. The method for producing hydrogen according to claim 16, further comprising heating the hydrogen generating material and the water.

18. The method for producing a hydrogen generating material according to claim 10, wherein a content of the organic solvent in the liquid is 5 parts by mass or more with respect to 1 part by mass of water.

* * * * *